May 28, 1957 F. M. YEISER 2,793,754
FILTER
Filed Sept. 14, 1954 2 Sheets-Sheet 1

INVENTOR.
FRANK M. YEISER
BY
ATTY.

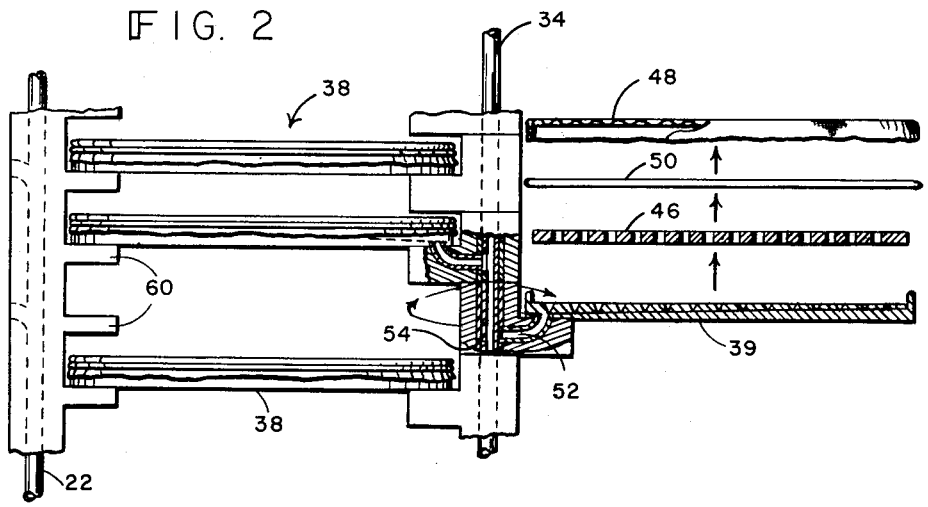
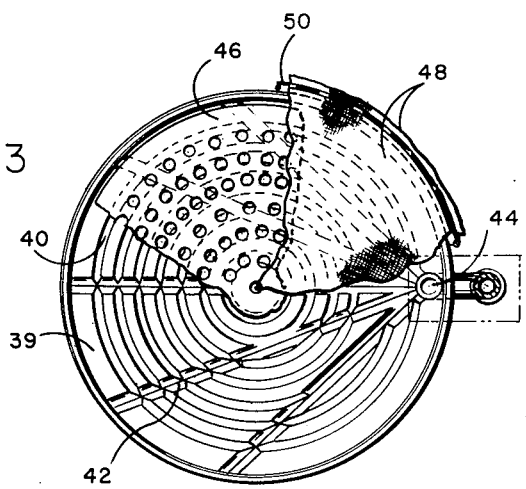

United States Patent Office 2,793,754
Patented May 28, 1957

2,793,754

FILTER

Frank M. Yeiser, East Walpole, Mass.

Application September 14, 1954, Serial No. 455,951

7 Claims. (Cl. 210—328)

This invention relates to a filter of the vertically stacked plate type and pertains more specifically to a pressure leaf filter of the horizontal leaf type having the leafs or plates pivotally mounted in a vertical stack.

One object of the invention is to provide a filter of the vertically stacked plate type in which the plates are mounted for individual swiveling to and from stacked position.

Another object is to provide a vertically stacked plate filter having the plates mounted on individual bearings for swinging movement in a generally horizontal plane to and from stacked position and having liquid conduit means for introducing or withdrawing liquid from the filter, the conduit means communicating with each plate through its respective bearing when the plate is in stacked position.

Still another object is to provide a vertically stacked plate filter with each plate mounted on an individual bearing adjacent one margin thereof for pivoting in a generally horizontal plane and having means for releasably supporting the margin of the plate remote from the bearing when the plate is in stacked position.

Still another object is to provide a vertically stacked plate filter of improved simplified construction capable of rapid cleaning and assembly.

Other and further objects will be apparent from the drawings and the description which follows.

In the drawings:

Fig. 2 is an enlarged detail view in elevation, partly broken away and in section, showing one plate in unstacked position with its filter cloth disassembled; and Fig. 3 is a plan view, partly broken away and in section, showing the construction of a filter plate.

Figure 1:
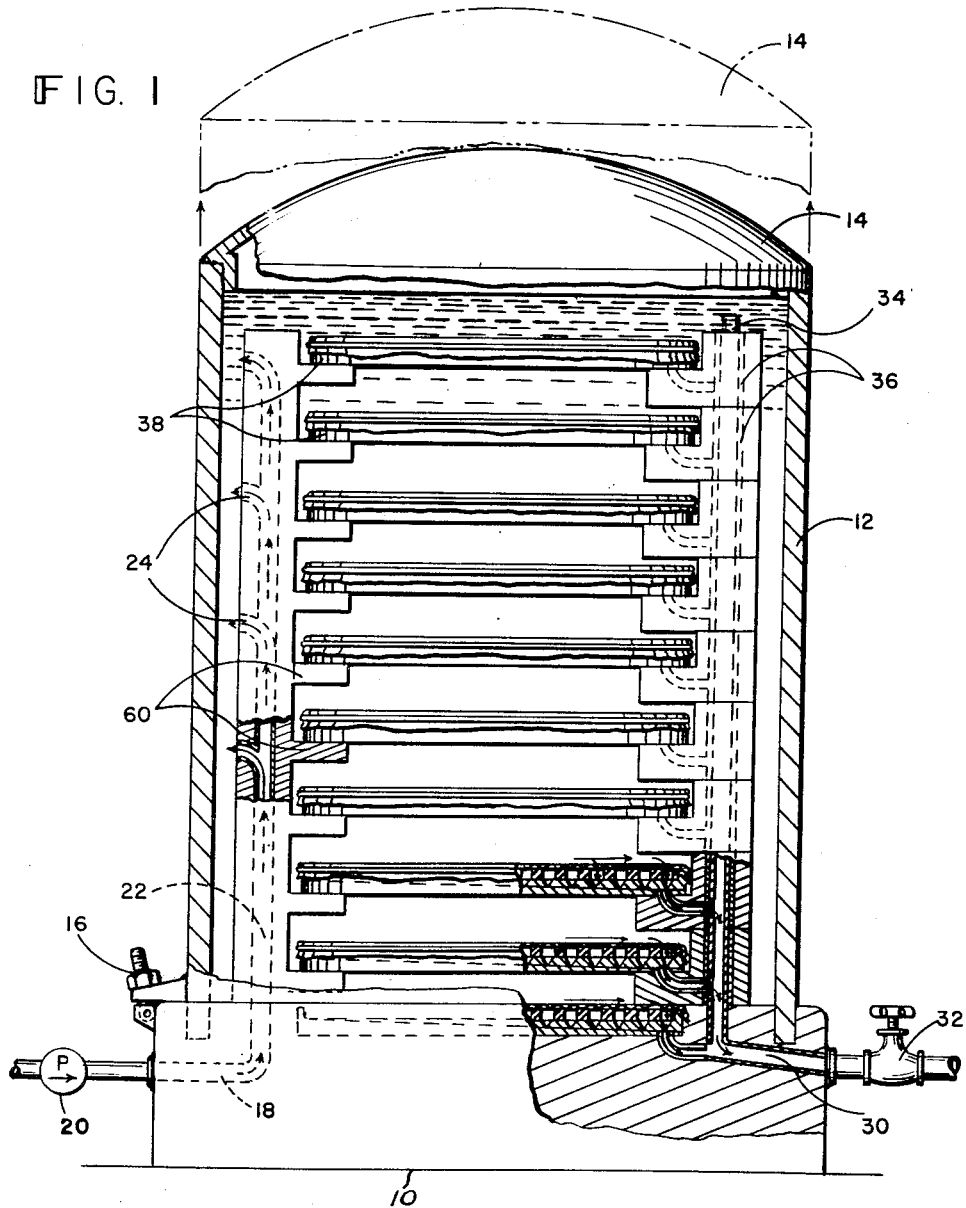
Fig. 1 is a view in vertical elevation of one embodiment of the invention, partly broken away and in section.

Referring to the drawings, the filter generally comprises a housing including base 10, and cylindrical side wall 12 together with a domed cover or lid 14 welded to the upper end of wall 12, all secured together in a hermetically sealed relationship by means of pivoted dogging bolts 16.

Base 10 includes an inlet passage 18 through which is supplied the liquid slurry or dispersion to be filtered, the slurry being supplied from pump 20. Mounted on base 10 within housing 12 is a generally vertically extending pipe or conduit 22 communicating with inlet 18 at its lower end and provided with a plurality of laterally extending ports 24, 24. Conduit 22, accordingly, acts as a manifold serving to distribute the slurry throughout the interior of the housing. Base 10 also includes an outlet passage 30 for discharge of the filtrate through outlet valve 32. Mounted on base 10 is a generally vertically extending hollow shaft 34, closed at its upper end, which is in spaced parallel relationship with inlet conduit 22 within the housing. Journaled on shaft 34 are a plurality of bearings 36, 36 to each of which is secured a filter plate 38, plate 38 being rotatable with its corresponding bearing 36 in a generally horizontal plane about shaft 34.

Plates 38, 38 may be of any conventional construction normally used in a filter press. In the embodiment shown, the upper or filtering face of the base member 39 of each plate, as shown in Fig. 3, includes a plurality of concentric channels or grooves 40 together with additional channels 42 radiating from outlet aperture 44. Channels 42 preferably slope downwardly toward outlet 44, as shown in Fig. 3, to facilitate drainage of the filtrate. Disposed on top of the base member is a perforated plate 46 which provides support for a conventional filter cloth or paper 48 secured over perforated plate 46 by means of clamping band 50. An outlet passage 52 is provided within each bearing 36, passage 52 communicating at one end with outlet 44 and at the other end with a mating port 54 in the wall of hollow shaft 34 when plate 38 is rotated to stacked position as shown in Fig. 1. The lower end of shaft 34 communicates with outlet passage 30 in base 10, shaft 34 thus serving both as an outlet for the filtrate and as a support for the plates 38.

In order to provide additional support for plates 38 when in operation, inlet conduit 22 may include a plurality of laterally extending supporting lugs 60 upon which the margin of each plate 38 remote from bearing 36 may be releasably supported. If desired, the lowermost plate in the stack may have its upper filtering face flush with the upper face of base 10, as shown in Fig. 1, thus avoiding any possible accumulation of sediment at the bottom of the housing.

In operation, the plates 38 with their respective filter cloths properly assembled in place are swung to stacked position with their outer margins resting upon lugs 60, as shown in Fig. 1. The cylindrical wall 12 and lid 14 are lowered into place and secured by means of dogging bolts 16 in liquid-tight engagement with base 10. The slurry to be filtered is then introduced through inlet 18 and conduit 22 by means of pump 20, the slurry substantially filling the housing, and the filtrate passes through the cloth and along the channels 40, 42 of the base member, thence through passage 52 in the bearings and port 54 in the hollow shaft of outlet pipe 34 to outlet passage 30. When the filter cake which is built up on the filter cloths has accumulated sufficiently, the introduction of slurry is stopped and withdrawal of filtrate is continued, by means of a pump (not shown) if necessary, until the housing is drained.

Wall 12 and lid 14 are then removed from base 10, as by a crane attached to lid 14 in any suitable manner (not shown), and each individual plate 38 is in turn pivoted about shaft 34 upon its respective bearing 36 to unstacked position, as shown in Fig. 2, whereupon the solid filter cake which has accumulated upon the surface of filter cloth 48 may readily be removed, as by a scraper or the like, or by removal of the filter paper or cloth. As soon as each plate 38 has been cleaned, and redressed if necessary, it may be pivoted back to stacked position to permit cleaning of the plate immediately beneath it. After all of the plates have been cleaned, the filter press is ready for further use.

It will be apparent that the construction of this improved filter press avoids the necessity for time-consuming disassembly of a stack of plates held together by bolts or the like and at the same time retains the filter cake on the surface of the filter plate without danger of its falling off. Since filter plates 38 are maintained in a generally horizontal position at all times, there is never any risk of loss of even very dry and loose filter cakes.

Although specific embodiments of the invention have been herein described, it is not intended to limit the invention solely thereto, but to include all of the obvious variations and modifications within the spirit and scope of the appended claims.

I claim:

1. A filter comprising a plurality of generally horizontally disposed filter plates arranged in a vertical stack, bearing means for pivotally supporting each plate adjacent its periphery, and a generally vertical conduit extending through said bearings communicating with each plate when in stacked position, each said plate being individually mounted for swinging movement in a generally horizontal plane about a generally vertical axis to and from a stacked position and an unstacked position.

2. A filter comprising a plurality of generally horizontally disposed filter plates arranged in a vertical stack, a filter medium disposed across a face of each plate, bearing means for pivotally supporting each said plate adjacent a margin thereof, each said plate being mounted for swinging movement in a generally horizontal plane to and from a stacked position and an unstacked position, feed means for supplying a filterable slurry to one face of each filter medium, and means for withdrawing filtrate from the opposite face of each filter medium through said bearing.

3. A filter as defined in claim 2 in which said feed means includes a generally vertically extending conduit adjacent the margin of said stacks of plates remote from said bearing means, and a lug projecting laterally from said conduit beneath the marginal portion of each plate adjacent said conduit for supporting each said plate when in stacked position.

4. A filter comprising a generally vertically extending liquid-conducting hollow shaft, a plurality of generally horizontally disposed filter plates, each plate having an upper filtering face and having a supporting bearing adjacent a margin thereof, said bearings being journaled on said shaft with said plates arranged in a vertically aligned stack, each plate being individually swingable in a generally horizontal plane about said shaft to and from a stacked position and an unstacked position, and a port in said shaft at the level of each bearing communicating through said bearing with the filtering face of the corresponding plate when said plate is in stacked position.

5. A filter as defined in claim 4 in which the filtering faces of said plates are channeled and a sheet filter medium is disposed over each said filtering face.

6. A filter as defined in claim 4 including a housing for enclosing said stacked plates and shaft, and inlet means for introducing a filterable slurry into said housing.

7. A filter as defined in claim 6 in which said inlet means comprises a generally vertically extending conduit in spaced parallel relation to said shaft within said housing, said conduit including means for releasably supporting each plate adjacent a margin thereof remote from said bearing.

References Cited in the file of this patent

UNITED STATES PATENTS

| | | |
|---|---|---|
| 565,972 | Fowler | Aug. 18, 1896 |
| 729,147 | Engel | May 26, 1903 |
| 808,675 | Mouck | Jan. 2, 1906 |
| 1,239,975 | Signor | Sept. 11, 1917 |
| 1,295,006 | Corey | Feb. 18, 1919 |
| 1,907,747 | Daman | May 9, 1933 |
| 1,958,394 | Renfrew | May 8, 1934 |
| 2,544,402 | Tessmer | Mar. 6, 1951 |

FOREIGN PATENTS

| | | |
|---|---|---|
| 633,203 | Great Britain | Dec. 12, 1949 |